(12) United States Patent
Camenisch et al.

(10) Patent No.: US 9,544,144 B2
(45) Date of Patent: Jan. 10, 2017

(54) DATA ENCRYPTION

(75) Inventors: Jan L. Camenisch, Ruschlikon (CH); Kristiyan Haralambiev, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/114,396

(22) PCT Filed: Apr. 13, 2012

(86) PCT No.: PCT/IB2012/051809
§ 371 (c)(1),
(2), (4) Date: Oct. 28, 2013

(87) PCT Pub. No.: WO2012/147001
PCT Pub. Date: Nov. 1, 2012

(65) Prior Publication Data
US 2014/0082361 A1 Mar. 20, 2014

(30) Foreign Application Priority Data
Apr. 29, 2011 (EP) ..................................... 11164311

(51) Int. Cl.
*H04L 29/06* (2006.01)
*H04L 9/32* (2006.01)
(Continued)

(52) U.S. Cl.
CPC ............... *H04L 9/32* (2013.01); *H04L 9/0838* (2013.01); *H04L 9/0847* (2013.01); *H04L 9/3073* (2013.01); *H04L 9/3221* (2013.01)

(58) Field of Classification Search
CPC ........ H04L 63/08; H04L 63/0428; H04L 9/08; H04L 9/32; H04L 9/3271; H04L 63/0847; H04L 9/3073; H04L 9/0838; H04L 9/3221
(Continued)

(56) References Cited

U.S. PATENT DOCUMENTS

2002/0049601 A1* 4/2002 Asokan et al. .................... 705/1
2003/0081785 A1* 5/2003 Boneh et al. ................. 380/277
(Continued)

FOREIGN PATENT DOCUMENTS

CN 101101675 A 1/2008
JP 2010186003 A 8/2010
(Continued)

OTHER PUBLICATIONS

International Search Report—PCT/IB2012/051809.
Camenisch et al., "Practical Verifiable Encryption and ecryption of Discrete Logarithms", Advances in Cryptology—CRYPTO 2003, 23rd Annual International Cryptology Conference, [online]Aug. 2003, p. 126-144, [retrieved on Sep. 10, 2015]. Retrieved from the Internet, URL <https://www.iacr.org/archive/crypto2003/27290126/27290126.pdf>.
(Continued)

*Primary Examiner* — Harunur Rashid
*Assistant Examiner* — Sakinah Taylor
(74) *Attorney, Agent, or Firm* — Scully, Scott, Murphy & Presser, P.C.; Jennifer R. Davis, Esq.

(57) ABSTRACT

Public key encryption methods and apparatus are provided for encrypting secret data under a public key in a data processing system (1). The secret data is provided as a message (m) comprising at least one element of a pair of base groups $G_1$, $G_2$ satisfying a bilinear map $\hat{e}: G_1 \times G_2 \rightarrow G_T$ where $G_T$ is a target group. The message (m) is encrypted using the public key to produce an encrypted message (c). A consistency component (v) is generated using the encrypted message (c) and the bilinear map whereby the consistency component (v) permits validation of the encrypted message without revealing the encrypted message. The output ciphertext (ct) comprises the encrypted message (c) and the consistency component (v).

12 Claims, 2 Drawing Sheets

(51) Int. Cl.
*H04L 9/08* (2006.01)
*H04L 9/30* (2006.01)

(58) Field of Classification Search
USPC .......................................................... 713/168
See application file for complete search history.

(56) References Cited

U.S. PATENT DOCUMENTS

| | | | |
|---|---|---|---|
| 2004/0073814 A1* | 4/2004 | Miyazaki et al. ............. | 713/202 |
| 2005/0166058 A1* | 7/2005 | Brokenshire ......... | H04L 9/0662 |
| | | | 713/181 |
| 2008/0063193 A1* | 3/2008 | Nishioka .......................... | 380/46 |
| 2009/0080658 A1* | 3/2009 | Waters et al. .................. | 380/277 |
| 2009/0327141 A1* | 12/2009 | Rabin et al. ..................... | 705/75 |
| 2010/0083001 A1* | 4/2010 | Shah ..................... | H04L 9/0822 |
| | | | 713/187 |
| 2010/0115281 A1 | 5/2010 | Camenisch et al. | |
| 2012/0300930 A1* | 11/2012 | Jutla ..................... | H04L 9/0844 |
| | | | 380/262 |
| 2012/0311331 A1* | 12/2012 | Zhang ........................... | 713/168 |
| 2014/0281491 A1* | 9/2014 | Zaverucha .............. | H04L 9/321 |
| | | | 713/155 |

FOREIGN PATENT DOCUMENTS

| | | |
|---|---|---|
| JP | 2010-200065 A | 9/2010 |
| WO | WO 2008/127428 A1 | 10/2008 |

OTHER PUBLICATIONS

Dodis et al., "Efficient Public-Key Cryptography in the Presence of Key Leakage", Advances in Cryptology—ASIACRYPT 2010—16th International Conference on the Theory and Application of Cryptology and Information Security—ASIACRYPT 2010, [online]Dec. 2010, p. 613-631, [retrieved on Sep. 10, 2015]. Retrieved from the Internet URL<http://www.iacr.org/archive/asiacrypt2010/6477617/6477617.pdf>.

Cramer et al., "Design and Analysis of Practical Public-Key Encryption Schemes Secure against Adaptive Chosen Ciphertext Attack", Cryptology ePrint Archive: Report 2001/108,[online]Dec. 17, 2001, Version: 20011217:130330, p. 1-62, [retrieved on Sep. 10, 2015]. Retrieved from the Internet, URL<https://eprint.iacr.org/2001/108.pdf>.

Boneth et al., "Conjunctive, Subset, and Range Queries on Encrypted Data", Cryptology ePrint Archive: Report 2006/287, [online]Mar. 21, 2007, Version: 20070321:171919, p. 1-29,[retrieved on Sep. 10, 2015]Retrieved from the Internet, URL<https://eprint.iacr.org/2006/287.pdf>.

Camenisch et al., "Structure Preserving CCA Secure Encryption and its Application to Oblivious Third Parties", Cryptology ePrint Archive: Report 2011/319, [online]Jun. 17, 2011, Version:20110617:071045, [retrieved on Sep. 10, 2015]. Retrieved from the Internet, URL<http://eprint.iacr.org/2011/319.pdf>.

* cited by examiner

DATA ENCRYPTION

CROSS-REFERENCE TO RELATED APPLICATIONS

The present invention relates to and claims the benefit of the filing date of commonly-owned, co-pending PCT Patent Application No. PCT/IB2012/051809, filed Apr. 13, 2012, which further claims the benefit of priority date of commonly-owned, co-pending European Patent Application No. EP 11164311.0, filed on Apr. 29, 2011, the entire contents and disclosure of which is incorporated by reference as if fully set forth herein.

This invention relates generally to data encryption and provides methods and apparatus for public key encryption of secret data in data processing systems.

Public key encryption is an important cryptographic tool in substantially any security protocol which aims to protect data communicated in data processing systems. The encryption scheme relies on a pair of cryptographic keys, namely a secret key and a public key, which are associated with a particular party to communications in the system. A party's public key is available to all users of the scheme, whereas the secret key remains secret to that party. When used in a basic messaging process where a sender wishes to communicate with a recipient while keeping the message data secret from others, the sender can encrypt the secret data via a cryptographic encoding process using the recipient's public key. Security relies on the premise that the resulting ciphertext can only be decrypted to recover the original plaintext message, i.e. the secret data, using the corresponding secret key of the key-pair. Thus only the authorised recipient, in possession of this secret key, can decrypt the ciphertext to reveal the secret data. Encryption schemes can also be used in other scenarios, e.g. to encrypt data under the public key of a trusted third party (TTP) such that a recipient of the resulting ciphertext can apply to the TTP to decrypt the ciphertext in certain circumstances. Such a system might be employed, for instance, to allow user identity data encrypted in a ciphertext to be revealed to a recipient of the ciphertext in the event that the user misbehaves, e.g. does not pay a bill.

In practice, the level of security provided by an encryption scheme ultimately depends on the extent to which an attacker can deduce information from a ciphertext without knowledge of the secret key. The current de-facto standard security notion for encryption schemes is known as "security against chosen-ciphertext attack" (CCA). This is defined in terms of the probability with which a notional attacker, operating under specified constraints (which permit limited access to a decryption oracle for decryption of ciphertexts chosen by the attacker), can detect which of two messages (plaintexts) corresponds to a given ciphertext. CCA-security is now the standard requirement because schemes fulfilling weaker security notions, e.g. so-called "semantic security" (security against chosen-plaintext attack (CPA)) have been shown to be vulnerable to certain types of attack.

There are many efficient public-key encryption schemes, but most require use of some sort of hash function such as collision-resistant hash functions or cryptographic hash functions. In particular, CCA-secure encryption schemes are typically obtained from semantically secure encryption schemes by adding consistency checks that prevent an attacker from modifying an observed ciphertext without detection. The final ciphertext contains both the encrypted message, produced by encryption of the plaintext message, and a consistency check component which is generated from the encrypted message using a hash function. A recipient of the ciphertext can verify that the consistency component is correct for the encrypted message and hence that the encrypted message is valid (i.e. has been validly computed by the sender and so not modified by an attacker). While this provides the basis for CCA security, the use of hash or similar functions in these schemes prevents certain proofs being made about the resulting ciphertext. In particular, certain relations between the input and output of these functions cannot be proved without actually revealing the input and output. It is therefore not possible, for example, to prove that a ciphertext has been validly computed without revealing the ciphertext itself. This is an important requirement in advanced security protocols where certain proofs must be made while preserving high levels of privacy. Specifically, some protocols require that a user does not reveal a ciphertext yet can provide evidence about certain properties of that ciphertext. For example, the user may simply need to prove that he is in possession of a ciphertext which is validly computed without revealing it to the verifying party. Additional proofs may also be required, e.g. that the message encrypted in the ciphertext satisfies certain requirements, again without revealing anything other than this fact to the verifier.

Examples of CCA-secure encryption schemes based on hash functions are described in: "A Practical Public Key Cryptosystem Provably Secure against Adaptive Chosen Ciphertext Attack", R. Cramer and V. Shoup, CRYPTO '98, pages 13-25, Springer-Verlag, 1998; and "Design and Analysis of Practical Public-Key Encryption Schemes Secure against Adaptive Chosen Ciphertext Attack", R. Cramer and V. Shoup, SIAM Journal on Computing, 33:167-226, 2001. A hash-free variant of the Cramer-Shoup encryption scheme is also described. In this hash-free scheme, the hashing is avoided by treating some part of the ciphertext (elements in a prime-order group) as a sequence of bits, chopping the sequence into blocks of bits, and treating the chopped values as numbers modulus the prime order which are then fed into a specific function evaluation. Essentially, this process builds a purpose-specific hash function which would allow proof of certain relations between the input and the output but require both the input and the output to be fully revealed. This of course defeats the object of proving relations between the input and the output because, if both are revealed, one could simply evaluate the appropriate function on the input and check the result against the given output. A linear Cramer-Shoup encryption scheme is also disclosed in "A Cramer-Shoup Encryption Scheme from the Linear Assumption and from Progressively Weaker Linear Variants, H. Shacham, 2007, Cryptology ePrint Archive, Report 2007/074. The security of this scheme is based on the Decisional Linear Assumption (DLIN) and relies crucially on the use of a hash function, again preventing proofs without revealing the ciphertext.

In the field of digital signatures, knowledge of a signature can be proved without revealing the signature to a verifier. Signature schemes permitting such proofs of knowledge can be implemented in a variety of ways. One example uses bilinear groups in implementing the signature scheme. This "structure-preserving" signature scheme is discussed in "Structure-Preserving Signatures and Commitments to Group Elements", Abe et al., CRYPTO 2010, LNCS 6223, pp. 209-236, 2010.

To date, there is no practicable encryption scheme whereby a user in possession of a ciphertext and a proof that the ciphertext was validly computed is able to prove to a verifier that he is in possession of such a validly-computed ciphertext without revealing it.

One aspect of the present invention provides a public key encryption method for encrypting secret data under a public key in a data processing system. The method comprises:

provided the secret data as a message comprising at least one element of a pair of base groups $G_1$, $G_2$ satisfying a bilinear map $\hat{e}: G_1 \times G_2 \rightarrow G_T$ where $G_T$ is a target group;

encrypting the message using the public key to produce an encrypted message;

generating a consistency component using the encrypted message and the bilinear map whereby the consistency component permits validation of the encrypted message without revealing the encrypted message; and outputting a ciphertext comprising the encrypted message and the consistency component.

Public key encryption methods embodying this invention make use of a bilinear map to generate a consistency component for an encrypted message in a ciphertext. The encrypted message is produced by public key encryption of a message which comprises one or more elements of a pair of base groups satisfying a bilinear map to a target group. The consistency component is then generated using the encrypted message and the bilinear map whereby the resulting consistency component can be used to validate the encrypted message without revealing the encrypted message itself. This provides the basis for highly efficient encryption schemes which are both CCA-secure and also allow proofs to be made about a ciphertext, e.g. that the ciphertext has been validly computed, without having to reveal the ciphertext in the proof. These schemes can thus be considered "structure-preserving encryption schemes", where the term "structure-preserving" is used here in the sense that a certain structure is built into the whole ciphertext which allows such proofs to be made.

In general, the data processing system in which encryption methods embodying the invention are performed may comprise one or more (localised or distributed) devices or components for processing data, and the secret data may comprise any data which is to be protected from unauthorised access. In some embodiments, the step of providing the secret data as a message comprising group element(s) may involve an encoding step whereby input user data is encoded to obtain a message containing group element(s) representing that user data. In other embodiments, the message representing the secret data may simply be provided in the system, e.g. stored in system memory, for use in the encryption process. In any case, the message may in general comprise one or more elements of the base groups $G_1$, $G_2$, where $G_1$ may or may not be equal to $G_2$.

The consistency component may be generated using one or more further items in addition to the encrypted message and the bilinear map, and the final ciphertext may include one or more additional components as well as the encrypted message and consistency component. While scenarios might be envisaged in which the consistency component can be revealed to a verifier in order to validate the (still secret) encrypted message, in preferred embodiments the consistency component permits validation of the encrypted message without revealing the consistency component or the encrypted message. This is readily achieved through use of the bilinear map in the consistency component. More generally, it is preferred that the encrypted message can be validated without revealing any components of the ciphertext, whereby possession of a valid ciphertext can be proven while preserving secrecy of the entire ciphertext. Again, through use of the bilinear map, the consistency component can be generated in such a manner as to achieve this.

The message may be encrypted using the public key in any convenient manner to produce the encrypted message to be included in the ciphertext. In the preferred embodiments detailed below, the encrypted message comprises at least one element of the pair of base groups, and the consistency component is generated by applying the bilinear map to the encrypted message. As already indicated, however, other items may be used in generating the consistency component. For example, methods embodying the invention will typically include the step of generating a random component which is then used in producing the final ciphertext. The consistency component in particular may be generated using this random component. Such a random component may comprise at least one element of the pair of base groups $G_1$, $G_2$, and generation of the consistency component may include applying the bilinear map to the random component. The random component may then be included as a component of the final output ciphertext.

For practical reasons relating to use of the encryption scheme, a message to be encrypted may be associated with a label. The use of labels is well known in cryptography applications, e.g. to allow specific context information to be associated with a transaction. In the preferred encryption methods described below, the label associated with a given message is used in generating the corresponding consistency component. More specifically, such a label corresponds to at least one element of the pair of base groups $G_1$, $G_2$, and generation of the consistency component includes applying the bilinear map to the element(s) corresponding to the label.

The ciphertext produced by encryption methods embodying the invention could be output to memory and stored for use in a subsequent proof protocol. Alternatively, for example, the ciphertext could be sent to a remote party who may then use the ciphertext in proof protocols while preserving secrecy of the ciphertext. For example, the ciphertext may be transmitted via a data communications channel to another device in which the ciphertext is ultimately to be used in proof protocols. In any case, methods embodying the invention may include the step of performing a cryptographic proof of knowledge of the encrypted message and using the consistency component for validation of the encrypted message. Such a proof might in general use the consistency component in various ways for validation, though ideally the consistency component is not revealed in this process. Preferred methods therefore perform a cryptographic proof of knowledge of both the encrypted message and a consistency component which validates that encrypted message. The invention also provides a method for proving knowledge of a ciphertext, comprising receiving a ciphertext produced by a method according to the first aspect of the invention, and performing a cryptographic proof of knowledge of the encrypted message and using the consistency component for validation of the encrypted message.

Another aspect of the invention provides a computer program comprising program code means for causing a computer to perform a method according to a foregoing aspect of the invention. It will be understood that the term "computer" is used in the most general sense and includes any device, component or system having a data processing capability for implementing a computer program, and may thus comprise one or more processors of a single device or distributed system of devices. Moreover, a computer program embodying the invention may constitute an independent program or program set, or may be part of a larger program or program set, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A further aspect of the invention provides apparatus for encrypting secret data under a public key. The apparatus comprises memory for storing the secret data as a message comprising at least one element of a pair of base groups $G_1$, $G_2$ satisfying a bilinear map $\hat{e}$: $G_1 \times G_2 \rightarrow G_T$ where $G_T$ is a target group, and control logic adapted to:
- encrypt the message using the public key to produce an encrypted message;
- generate a consistency component using the encrypted message and the bilinear map whereby the consistency component permits validation of the encrypted message without revealing the encrypted message; and
- output a ciphertext comprising the encrypted message and the consistency component.

In general, where features are described herein with reference to an embodiment of one aspect of the invention, corresponding features may be provided in embodiments of another aspect of the invention.

Preferred embodiments of the invention will now be described, by way of example, with reference to the accompanying drawings in which.

Figure 1:
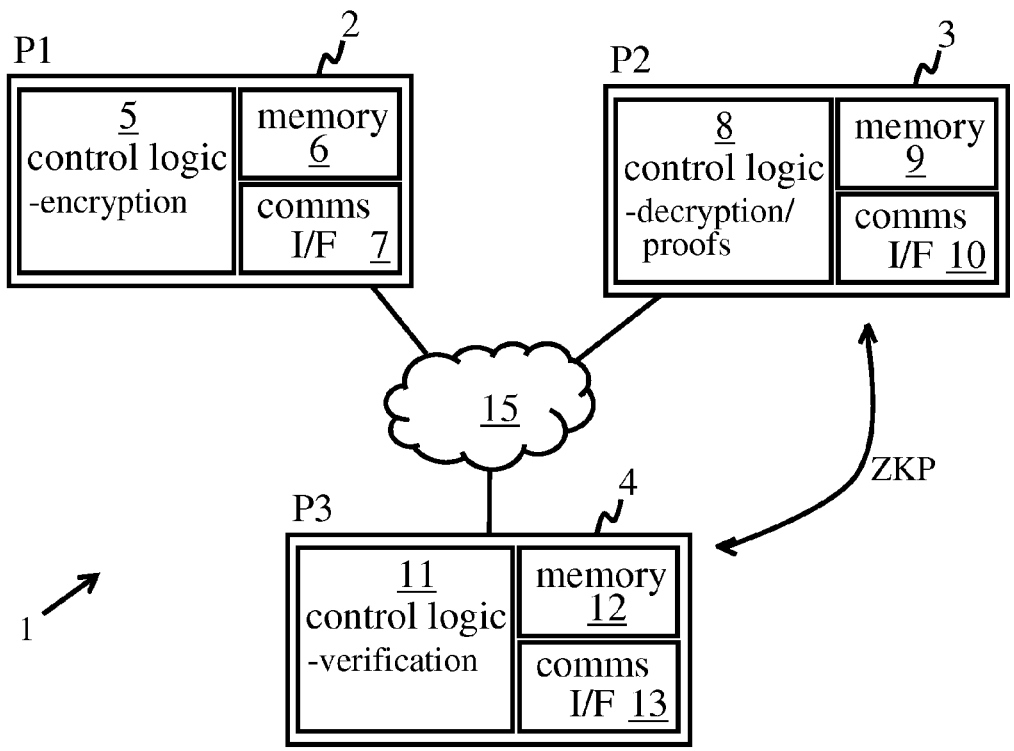
FIG. 1 is a schematic illustration of an exemplary data processing system for implementing methods embodying the invention.

FIG. 1 is a simplified schematic of a data processing system showing the main components involved in operation of the encryption-based techniques to be described. For the purposes of this description, we consider an exemplary system 1 involving three parties P1, P2 and P3 represented by respective computers 2, 3 and 4 in the figure. Computer 2 implements encryption apparatus embodying the invention for encrypting secret data in the examples to be described. Computer 2 includes control logic 6 for controlling operation of the computer generally and implementing key steps of the encryption process. The computer 2 also includes memory 6 for storing data used in the encryption process, and a communications interface 7. Computer 3 includes control logic 8 for controlling operation of computer 3, memory 9 and a communications interface 10. The control logic 8 includes functionality for decrypting messages received from computer 2 in a scenario described below. Control logic 8 also includes functionality for implementing proof protocols with a verifier, represented by computer 4 here, in another scenario described below. In particular, the control logic 8 can implement zero knowledge proof (ZKP) protocols with verifier 4 in the scenario to be described. The verifier computer 4 has control logic 11 for controlling the computer generally and including functionality for verification of proofs made by computer 3. The verifier computer further includes memory 12 for use in these processes and also a communications interface 13.

In operation of system 1, computers 2, 3 and 4 can communicate over a data communications network 15 via their respective communications interfaces (where network 15 may in practice comprise a plurality of component networks and/or internetworks). The control logic 5, 8, 11 of these computers is configured for implementing the appropriate steps of the cryptographic processes described below. In general, this control logic may be implemented in hardware or software or a combination thereof, and the precise form of the devices implementing parties P1 to P3 is largely irrelevant to fundamental operation of the processes described. In this particular example, however, we assume that these devices are implemented by general-purpose computers and that control logic 5, 8 and 11 is implemented by respective computer programs which configure the host computers to perform the functions described. Suitable software will be apparent to those skilled in the art from the description herein.

Figure 2:
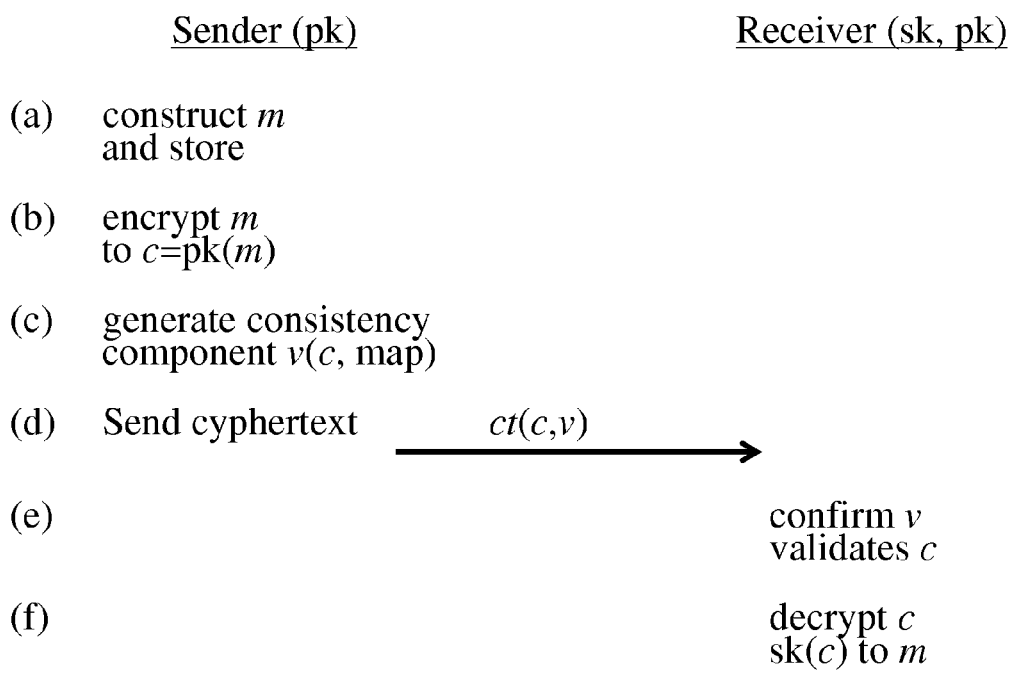
FIG. 2 illustrates steps performed by system devices implementing an encryption/decryption process embodying the invention.

The encryption scheme embodying the invention will be described first in the context of a straightforward communications operation whereby party P1, acting as the "sender", needs to send a message to party P2, the "receiver", while preserving privacy of the data in question. The key steps in this operation are indicated in FIG. 2. Steps performed by sender computer 2 are shown on the left of this figure and those performed by receiver computer 3 are shown on the right. This operation utilizes a cryptographic key pair (sk, pk) associated with receiver 3. Both keys are known to receiver 3 and held in receiver memory 9. The key pk is a public key which is published by receiver 3 in system 1. This key can therefore be accessed by sender 2 and stored in sender memory 6. The key sk is a secret key and remains secret to receiver 3.

In a first step, step (a), of the messaging operation, the encryption logic 5 of sender 2 constructs a message m comprising the secret data to be communicated. In this step, the secret data is represented by one or more elements of a pair of algebraic groups as discussed further below. Where appropriate, this step may involve any convenient coding process to encode secret data into group elements. In any case, the resulting set of (one or more group elements) is stored as message m in memory 6. In step (b) of the process, the encryption logic 5 of sender computer 2 encrypts the message m using the receiver's public key pk, thereby producing an encrypted message c. The encryption process is described in more detail below. Next, in step (c), the encryption logic generates a consistency component v for the encrypted message. As detailed below, the consistency component is generated using the encrypted message c and a bilinear map which is associated with the algebraic groups from which the message m is constructed. A ciphertext ct, which includes both the encrypted message c and its verification component v, forms the output of the encryption process by logic 5. In step (d), the ciphertext ct is transmitted via communications interface 7 of sender computer 2 over network 15 to receiver computer 3. The ciphertext is received by computer 3 via its communications interface 10 and stored in memory 9. The decryption logic 8 of receiver 3 then determines in step (e) whether the ciphertext is valid. In particular, the decryption logic 8 determines whether the consistency component v is correct for (i.e. consistent with) the encrypted message c in the ciphertext. Details of this process are given below. If the consistency component is determined to be correct then this confirms that the encrypted message is valid, i.e. it has been validly computed by the sender and has not been tampered with in transit over network 15. Assuming the ciphertext is validated in step (e), then the decryption logic 8 proceeds in step (f) to decrypt the encrypted message c using its secret key sk. The decryption process recovers the original message m and hence the secret data sent by sender 2. (Note that any encoding scheme originally used to encode data into message elements will be common knowledge of both sender and receiver whereby decoding of message elements to user data can be performed by logic 8 where required).

A particularly preferred implementation of the above encryption scheme, including details of the underlying cryptographic processes, is described in the following.

For the purposes of this scheme, a message m contains at least one element of a pair of base groups $G_1$, $G_2$ satisfying a bilinear map $\hat{e}$: $G_1 \times G_2 \rightarrow G_T$ where $G_T$ is a target group. For simplicity in this example, $G_1$ and $G_2$ are taken to be identical groups denoted by G. In particular, G and $G_T$ represent groups of prime order q equipped with a non-degenerate, efficiently computable bilinear map $\hat{e}$: $G \times G \rightarrow G_T$.

The scheme to be described is secure under the Decisional Linear Assumption (DLIN). This assumption is well-known in the art and can be expressed as follows: let G be a group of prime order q; $g_1$, $g_2$, $g_3 \leftarrow G$; and r, s, t$\leftarrow Z_q$. The following two distributions are computationally indistinguishable: (G, $g_1$, $g_2$, $g_3$, $g_1^r$, $g_2^s$, $g_3^r$) and (G, $g_1$, $g_2$, $g_3$, $g_1^r$, $g_2^s$, $g_3^{r+s}$).

For simplicity in this example, the scheme will be described as encrypting a message m that is a single group element in G. The scheme also supports labels. In particular, a message m is deemed to be associated with a label which corresponds to at least one element of the pair of base groups $G_1$, $G_2$ (here the same group G). The use of labels is well known in the encryption field and need not be discussed in detail here. It suffices to understand that a label permits additional information to be associated with a message. For example, labels might be used to attach context information to a transaction, permitting different transactions involving the same message m to be distinguished by use of a different label in each transaction. For simplicity in this example, a label L is assumed to be a single group element in the pair of base groups (and hence in the single group G here).

A key pair (sk, pk) to be used in the scheme is generated as follows:

KeyGen($1^\lambda$): Choose random group generators g, $g_1$, $g_2$, $g_3 \leftarrow G^*$. For randomly chosen $\vec{x} \leftarrow Z_q^3$ set $h_1 = g_1^{x_s} g_3^{x_s}$, $h_2 = g_2^{x_s} g_3^{x_s}$. Then, select $\vec{y}_0 \ldots, \vec{y}_5 \leftarrow Z_q^3$, and compute $f_{i,1} = g_1^{y_{i,s}} g_3^{y_{i,s}}$, $f_{i,2} = g_2^{y_{i,s}} g_3^{y_{i,s}}$, for i=0, . . . , 5. Output the public key pk=(G, g, $g_1$, $g_2$, $g_3$, $h_1$, $h_2$, $\{f_{i,1}, f_{i,2}\}_{i=0}^5$) and the secret key sk=($\vec{x}$, $\{\vec{y}\}_{i=0}^5$).

The encryption scheme as employed in steps (b) to (d) of FIG. 2 is defined by the following:

Encrypt (m): Choose random and r, s$\leftarrow Z_q$.
A random component, consisting of three elements $u_1$, $u_2$ and $u_3$, is generated as:

$$u_1 = g_1^r, u_2 = g_2^s, u_3 = g_3^{r+s}.$$

The encrypted message c is generated using the public key pk as: $c = m \cdot h_1^r h_2^s$.
The verification component v is generated as:

$$v = \prod_{i=0}^{3} \hat{e}(f_{i,1}^r f_{i,1}^s, u_i) \cdot \hat{e}(f_{4,1}^r f_{4,2}^s, C) \cdot \hat{e}(f_{5,1}^r f_{5,2}^s, L)$$

where $u_0 = g$.

The output ciphertext is then constructed as: $\vec{ct} = (u_1, u_2, u_3, c, v)$.

Both the encrypted message and the random component in this algorithm comprise a set of elements from the pair of base groups (here the same group G). In this particular example the encrypted message consists of a single group element and the random component consists of three group elements. The consistency component v is generated by applying the bilinear map to the encrypted message c, the random component elements $u_1$ to $u_3$, and the label L. Each application of the bilinear map yields an element of the target group $G_T$. A product of these elements is calculated in accordance with the formula given above to yield a final consistency component which comprises a single element of $G_T$ in this example. The output ciphertext ct here is a concatenation of the random component, the encrypted message c and the verification component v.

The decryption scheme as employed in steps (e) to (f) of FIG. 2 is defined by the following:

Decrypt $^L(\vec{ct})$: Parse $\vec{ct}$ as ($u_1$, $u_2$, $u_3$, c, v) and check whether:

$$v = ? \prod_{i=0}^{3} \hat{e}(u_1^{y_{i,1}} u_2^{y_{i,2}} u_3^{y_{i,3}}, u_i) \cdot \hat{e}(u_1^{y_{4,1}} u_2^{y_{4,2}} u_3^{y_{4,3}}, c) \cdot \hat{e}(u_1^{y_{5,1}} u_2^{y_{5,2}} u_3^{y_{5,3}}, L)$$

where $u_0 g$. If this is successful then the ciphertext is validated. If unsuccessful the ciphertext is rejected as invalid. Assuming validation, the ciphertext is decrypted using the secret key sk via:

$$m = c \cdot (u_1^{x_1} u_2^{x_2} u_3^{x_3})^{-1}$$

revealing the original message m.

The above defines an efficient construction for a CCA encryption scheme which is secure under DLIN. CCA security can be easily demonstrated via the usual game analysis which will be readily apparent to those skilled in the art and need not be reproduced here. Moreover, the above scheme possesses a major advantage over prior CCA encryption schemes. As described earlier, prior schemes employ techniques such as cryptographic hash functions, collision-resistant hash functions, or chopping of elements of an underlying semantically-secure encryption scheme in calculating the consistency-check components. Even if such schemes use elements of algebraic groups, e.g. in secret keys and random components, the consistency checks are implemented in a way which moves the elements of the encryption scheme out of the algebraic groups. The loss of this underlying structure prevents proof of relationships between the input and output of the consistency check functions as explained earlier. In contrast, the above encryption scheme preserves structure by implement the consistency check in a manner that does not leave the realm of algebraic groups. Specifically, the consistency check functionality in the above system uses a bilinear map between different algebraic groups in which a semantically-secure encryption scheme is embedded. The above construction therefore provides a structure-preserving CCA encryption scheme whereby a certain structure is built into the whole ciphertext which is important for protocols requiring proof of certain properties of a ciphertext while at the same time preserving high levels of privacy. In particular, the scheme allows proofs to be made about an encrypted message without revealing the encrypted message or indeed any of the ciphertext components. Thus, a party in possession of a ciphertext generated by this scheme can prove to a verifier that he possesses a validly-computed ciphertext without revealing the ciphertext to the verifier.

Figure 3:
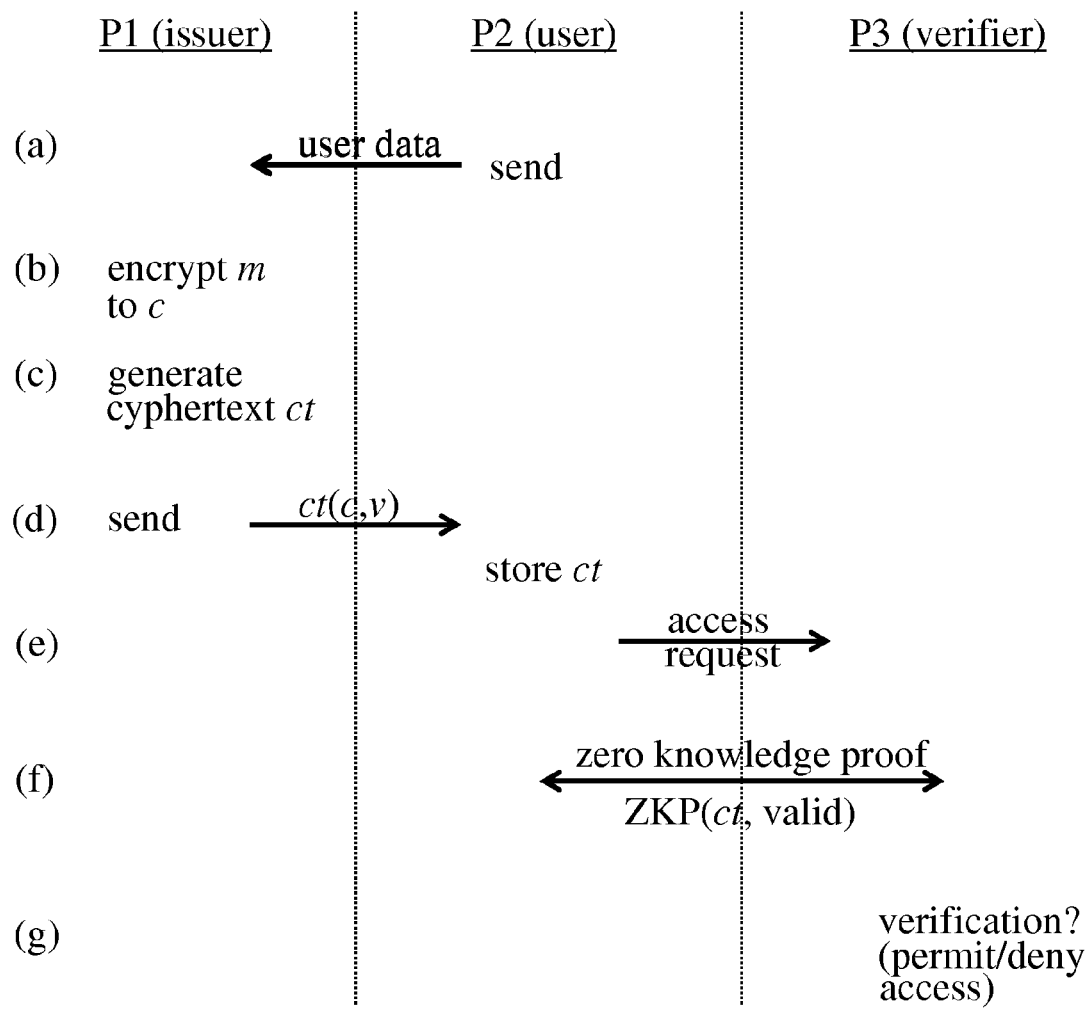
FIG. 3 illustrates interaction between system devices in an exemplary application of an encryption scheme embodying the invention.

The encryption scheme may be used in a variety of scenarios where it is required to make proofs about a secret ciphertext to a verifier. In these scenarios, the encryption may be performed under the public key of various different parties. For example, in applications where a party needs to prove to a verifier that he possesses a valid ciphertext without revealing the ciphertext itself to the verifier, the encryption may be performed under the public key of some party who is trusted by the verifier. An example of such a scenario will be described in the following in relation to the simple data processing system of FIG. 1. In this scenario, the ciphertext in question forms part of a credential which is issued to a user who then wishes to use the credential to gain access to a service provided by a verifier. For the purposes of this scenario, party P1 in FIG. 1 represents the credential issuer, with party P2 representing the user and P3 the verifier. The key steps in implementation of the scheme are indicated in FIG. 3. In this figure, operations performed by the three parties issuer, user and verifier are indicated respectively by the left, centre and right-hand columns In step (a) of the process, the user data for which the credential is to be issued is sent by user computer 3 to issuer computer 2. For this exemplary scenario the user data is assumed to be user identity (ID) data. Issuer computer 2 is trusted by both user and verifier here. In step (b), the encryption logic 5 of issuer 2, after confirming validity of the user ID as necessary, encrypts a message m representing the ID data (and any other data to be included in the credential) under the public key pk corresponding to its own secret key sk. A ciphertext ct including the resulting encrypted message c is then generated in step (c) as detailed above. This ciphertext ct may serve as a credential in its own right or may form part of a credential which is generated by issuer 2 in any convenient manner. In any case, the credential comprising ciphertext ct is then returned to user computer 3 in step (d) and stored in memory 9.

In this scenario, user 3 can use the received credential to gain access to a service provided by verifier 4. As a condition for accessing the service, the user must prove possession of a validly-computed ciphertext ct for his ID data. The structure-preserving encryption scheme employed in steps (b) and (c) allows this to be done without revealing the ciphertext ct to the verifier. User 3 sends a request to access the service in step (e) of the FIG. 3 process. In step (f), control logic 8 of user computer 3 then engages verification logic 11 of verifier computer 4 in a ZKP proof of knowledge of the encrypted ID c and a consistency component v which validates the encrypted ID c. In this way, user 3 proves possession of a validly computed ciphertext for his ID data. Due to the structure preserving nature of the encryption scheme, this proof can be made in generally known manner using standard cryptographic techniques, and suitable implementations will be readily apparent to those skilled in the art. By way of example, the ZKP proof can be made by exploiting the Groth Sahai proof system described in "Efficient Non-interactive Proof Systems for Bilinear Groups", Jens Groth, Amit Sahai, EUROCRYPT 2008: 415-432. Alternatively, for example, the ZKP proof might be made using normal discrete logarithm based proofs as described, for instance, in "On the Portability of Generalized Schnorr Proofs", Camenisch, et al., Eurocrypt 2009, LNCS 5479, pp. 425-442, 2009. Such ZKP proofs do not reveal to the verifier anything other than that which is to be proved. The construction of the encryption scheme further allows additional zero-knowledge proofs to be made, in particular proofs relating to the message m encrypted in the ciphertext. For instance, it can be proved that the message has certain properties without revealing the message itself. Thus, for example, it can be proved in zero knowledge that the ciphertext encrypts a valid user ID without revealing the ID itself. Depending on whether the proofs are correctly made by the user and verified by computer 4 in step (f), then in step (g) verifier 4 either permits or denies the user access to the service according to the result of the verification procedure.

A particular example of a scenario like FIG. 3 is where a user has to prove knowledge of a so-called "leakage-resilient signature" a component of which is a ciphertext. However, numerous scenarios involving the basic principles described above can be envisaged. In some applications, the encryption may be performed under the public key of trusted third party (TTP). Applications can also be envisaged where the party performing the encryption also performs a proof relating the resulting ciphertext. In FIG. 1, for example, scenarios can be envisaged where computer 2, after encrypting a message under some public key, may prove knowledge of a validly computed ciphertext to a verifier 4. A particular example of such a scenario is where two parties jointly compute an encryption of their messages without revealing them. This forms the subject of our copending European patent application filed concurrently herewith under Applicant's reference CH9-2010-0085 (the content of which is incorporated herein by reference).

While exemplary embodiments have been described above, many alternatives and modifications can be envisaged. For example, while the detailed construction has been illustrated for a message m that is a single group element, it will be apparent to those skilled in the art that the scheme extends in a straightforward manner to messages comprising a vector of group elements. Similarly, the scheme extends trivially to the case where a label L is a vector of group elements. Also, labels from the space $\{0, 1\}^*$ could be hashed to one or more group elements, so in general labels could be any bit strings which correspond to group elements.

Various modifications to the detailed encryption protocol can also be envisaged. For example, a variety of different encryption schemes may be employed to generate the encrypted message c from the plaintext message m. The consistency component v can also be generated in different ways. In the above formulation, for example, the consistency component comprises at least one element of the target group $G_T$. This is a particularly efficient formulation. In an alternative construction, however, the consistency component could comprise one or more pairs of elements from respective base groups $G_1$ and $G_2$. In this case, the bilinear map is used in the consistency component through use of pairs of group elements by which the bilinear map is satisfied, and this can be verified in the corresponding verification procedure. This type of implementation may offer greater flexibility for use in different scenarios. The details of such an implementation will be readily apparent to one skilled in the art.

While a simple data processing system 1 is used for illustrative purposes above, encryption schemes embodying the invention may be implemented in various systems involving processing devices other than general-purpose computers, e.g. mobile phones, PDAs (personal digital assistants), smart cards, card-readers, etc. In some applications, for instance, ciphertexts encrypting user data may be stored on smart cards, e.g. identity cards storing user ID data, and used in proof protocols for various applications.

It will be appreciated that many other changes and modifications can be made to the embodiments described without departing from the scope of the invention.

The invention claimed is:

1. A public key encryption method for encrypting secret data under a public key in a data processing system including a sender device and a receiver device in communication therewith, the method comprising:

constructing, at the sender device, a message (m) having secret data, the secret data comprising at least one element of a pair of base groups $G_1$, $G_2$ satisfying a bilinear map ê: $G_1 \times G_2 \rightarrow G_T$ where $G_T$ is a target group;

encrypting, at the sender device, the message (m) using said public key to produce an encrypted message (c);

generating a random component, the random component comprising three elements $u_1$, $u_2$ and $u_3$ generated according to $u_1 = g_1^r$; $u_2 = g_2^s$; and $u_3 = g_3^{r+s}$ where $g_1$, $g_2$ and $g_3$ are random group generators from a same base group G, r and s are random numbers generated from another base group generator;

generating, at the sender device, a consistency component (v) using said random component, said generating comprising: applying said bilinear map to the encrypted message (c) to obtain a first element and applying the bilinear map to the at least one element of said random component to obtain at least one second element, said bilinear map being applied to each said $u_1$, $u_2$ and $u_3$ according to: $ê(f_{i,1}^r f_{i,2}^s, u_i)$ where i=0, . . . , 3, where $u_0 = g$, $f_{i,1}^r$ is a function of random group generators $g_1$ and $g_3$, and $f_{i,2}^s$ is a function of random group generators $g_2$ and $g_3$, and computing a product of said first element and at least one second element to obtain a single element in $G_T$ comprising said consistency component, whereby the consistency component (v) permits validation of the encrypted message without revealing the encrypted message;

outputting a ciphertext (ct) comprising the encrypted message (c), the random component, and the consistency component (v); and transmitting said ciphertext (ct) over a communications network to said receiver device for decryption thereof, said receiver device configured to implement decryption logic for verifying whether said consistency component (v) is correct for the encrypted message (c), and if correct, further configured to decrypt the encrypted message (c) to obtain said secret data.

2. The method as claimed in claim 1 wherein the consistency component (v) is generated in such a manner as to permit validation of the encrypted message (c) without revealing the consistency component (v).

3. The method as claimed in claim 1 wherein the encrypted message (c) comprises at least one element of said pair of base groups.

4. The method as claimed in claim 1 wherein the consistency component (v) comprises at least one pair of elements from respective base groups.

5. The method as claimed in claim 1 wherein the consistency component (v) is generated in such a manner as to permit validation of the encrypted message (c) without revealing the ciphertext (ct).

6. The method as claimed in claim 1 wherein the message (m) is associated with a label corresponding to at least one element of the pair of base groups, and the method including generating the consistency component (v) using said at least one element corresponding to the label.

7. The method as claimed in claim 6 wherein generation of the consistency component (v) includes applying the bilinear map to said at least one element corresponding to the label.

8. The method as claimed in claim 1 including performing a cryptographic proof of knowledge of the encrypted message (c) and using the consistency component (v) for validation of the encrypted message.

9. The method for proving knowledge of a ciphertext, the method comprising:

receiving, at said receiver device, the ciphertext (ct) produced at the sender device by the method as claimed in claim 1; and performing, at said receiver device, a cryptographic proof of knowledge of said encrypted message (c) and using said consistency component (v) for validation of the encrypted message.

10. The method as claimed in claim 8 including performing, at said receiver device, a cryptographic proof of knowledge of both the encrypted message (c) and a consistency component (v) which validates the encrypted message.

11. A computer program product comprising a non-transitory computer readable storage device tangibly embodying a program of instructions executable by a computer associated with a sender for causing the computer to perform a method comprising:

constructing a message (m) having secret data, the secret data comprising at least one element of a pair of base groups $G_1$, $G_2$ satisfying a bilinear map ê: $G_1 \times G_2 \rightarrow G_T$ where $G_T$ is a target group;

encrypting the message (m) using a public key to produce an encrypted message (c);

generating a random component, the random component comprising three elements $u_1$, $u_2$ and $u_3$ generated according to $u_1 = g_1^r$; $u_2 = g_2^s$; and $u_3 = g_3^{r+s}$ where $g_1$, $g_2$ and $g_3$ are random group generators from a same base group G, r and s are random numbers generated from another base group generator;

generating a consistency component (v) using said random component, said generating comprising: applying said bilinear map to the encrypted message (c) to obtain a first element and applying the bilinear map to the at least one element of said random component to obtain at least one second element, said bilinear map being applied to each said $u_1$, $u_2$ and $u_3$ according to: $ê(f_{i,1}^r, f_{i,2}^s, u_i)$ where i=0, . . . , 3, where $u_0 = g$, $f_{i,1}^r$ is a function of random croup generators $g_1$ and $g_3$ and $f_{i,2}^s$ is a function of random group generators $g_2$ and $g_3$ and computing a product of said first element and at least one second element to obtain a single element in $G_T$ comprising said consistency component, whereby the consistency component (v) permits validation of the encrypted message without revealing the encrypted message;

outputting a ciphertext (ct) comprising the encrypted message (c), the random component, and the consistency component (v); and transmitting said ciphertext (ct) over a communications network to said receiver device for decryption thereof, said receiver device configured to implement decryption logic for verifying whether said consistency component (v) is correct for the encrypted message (c), and if correct, further configured to decrypt the encrypted message (c) to obtain said secret data.

12. An apparatus for encrypting secret data under a public key, the apparatus comprising memory for storing the secret data as a message (m) comprising at least one element of a pair of base groups $G_1$, $G_2$ satisfying a bilinear map ê: $G_1 \times G_2 \rightarrow G_T$ where $G_T$ is a target group, and a programmed hardware processor associated with said memory, said hardware processor implementing control logic adapted to:

encrypt the message (m) using said public key to produce an encrypted message (c);

generate a random component, the random component comprising three elements $u_1$, $u_2$ and $u_3$ generated according to $u_1=g_1^r$; $u_2=g_2^s$; and $u_3=g_3^{r+s}$ where $g_1$, $g_2$ and $g_3$ are random group generators from a same base group G, r and s are random numbers generated from another base group generator;

generate a consistency component (v) using said random component, said generating consistency component (v) comprising: applying said bilinear map to the encrypted message (c) to obtain a first element and applying the bilinear map to the at least one element of said random component to obtain at least one second element, said bilinear map being applied to each said $u_1$, $u_2$ and $u_3$ according to: $\hat{e}(f_{i,1}^r, f_{i,2}^s, u_i)$ where $i=0, \ldots, 3$, where $u_0=g$, $f_{i,1}^r$ is a function of random group generators $g_1$ and $g_3$, and $f_{i,2}^s$ is a function of random group generators $g_2$ and $g_3$, and computing a product of said first element and at least one second element to obtain a single element in $G_T$ comprising said consistency component, whereby the consistency component (v) permits validation of the encrypted message without revealing the encrypted message;

output a ciphertext (ct) comprising the encrypted message (c), the random component, and the consistency component (v); and transmit said ciphertext (ct) over a communications network to said receiver device for decryption thereof, said receiver device configured to implement decryption logic for verifying whether said consistency component (v) is correct for the encrypted message (c), and if correct, further configured to decrypt the encrypted message (c) to obtain said secret data.

* * * * *